(12) United States Patent
Armstrong et al.

(10) Patent No.: US 7,328,438 B2
(45) Date of Patent: Feb. 5, 2008

(54) DEALLOCATION OF COMPUTER DATA IN A MULTITHREADED COMPUTER

(75) Inventors: Willaim Joseph Armstrong, Rochester, MN (US); Peter Joseph Heyrman, Rochester, MN (US); Naresh Nayar, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1035 days.

(21) Appl. No.: 10/400,702

(22) Filed: Mar. 27, 2003

(65) Prior Publication Data

US 2004/0194096 A1    Sep. 30, 2004

(51) Int. Cl.
*G06F 9/46* (2006.01)

(52) U.S. Cl. .................. 718/100; 718/102; 707/206; 711/100

(58) Field of Classification Search ................ 718/104, 718/100, 102; 711/1, 100; 710/5, 19, 20; 707/206

See application file for complete search history.

(56) References Cited

U.S. PATENT DOCUMENTS

| | | | | |
|---|---|---|---|---|
| 5,499,329 | A | * | 3/1996 | Motoyama et al. ......... 715/513 |
| 6,279,046 | B1 | | 8/2001 | Armstrong et al. |
| 6,633,916 | B2 | * | 10/2003 | Kauffman .................... 709/229 |
| 6,993,770 | B1 | * | 1/2006 | Detlefs et al. ............... 719/315 |
| 7,117,502 | B1 | * | 10/2006 | Harris ......................... 719/315 |
| 2005/0021898 | A1 | * | 1/2005 | Alverson et al. ............. 711/1 |

FOREIGN PATENT DOCUMENTS

| | | |
|---|---|---|
| JP | 62-008234 | 1/1987 |
| JP | 63-141148 | 6/1988 |
| JP | 04-302339 | 10/1992 |
| JP | 04-333143 | 11/1992 |
| JP | 07-114470 | 5/1995 |
| JP | 10-293695 | 11/1998 |
| JP | 2001-265611 | 9/2001 |

OTHER PUBLICATIONS

U.S. Appl. No. 10/422,426, "High Performance Synchronization of Resource Allocation in a Logically-Partitioned System," William J. Armstrong et al., filed Apr. 24, 2003.

* cited by examiner

*Primary Examiner*—Meng-Al T. An
*Assistant Examiner*—Lilian Vo
(74) *Attorney, Agent, or Firm*—Wood, Herron & Evans, LLP

(57) ABSTRACT

An apparatus, program product and method support the deallocation of a data structure in a multithreaded computer without requiring the use of computationally expensive semaphores or spin locks. Specifically, access to a data structure is governed by a shared pointer that, when a request is received to deallocate the data structure, is initially set to a value that indicates to any thread that later accesses the pointer that the data structure is not available. In addition, to address any thread that already holds a copy of the shared pointer, and thus is capable of accessing the data structure via the shared pointer after the initiation of the request, all such threads are monitored to determine whether any thread is still using the shared pointer by determining whether any thread is executing program code that is capable of using the shared pointer to access the data structure. Once this condition is met, it is ensured that no thread can potentially access the data structure via the shared pointer, and as such, the data structure may then be deallocated.

14 Claims, 3 Drawing Sheets

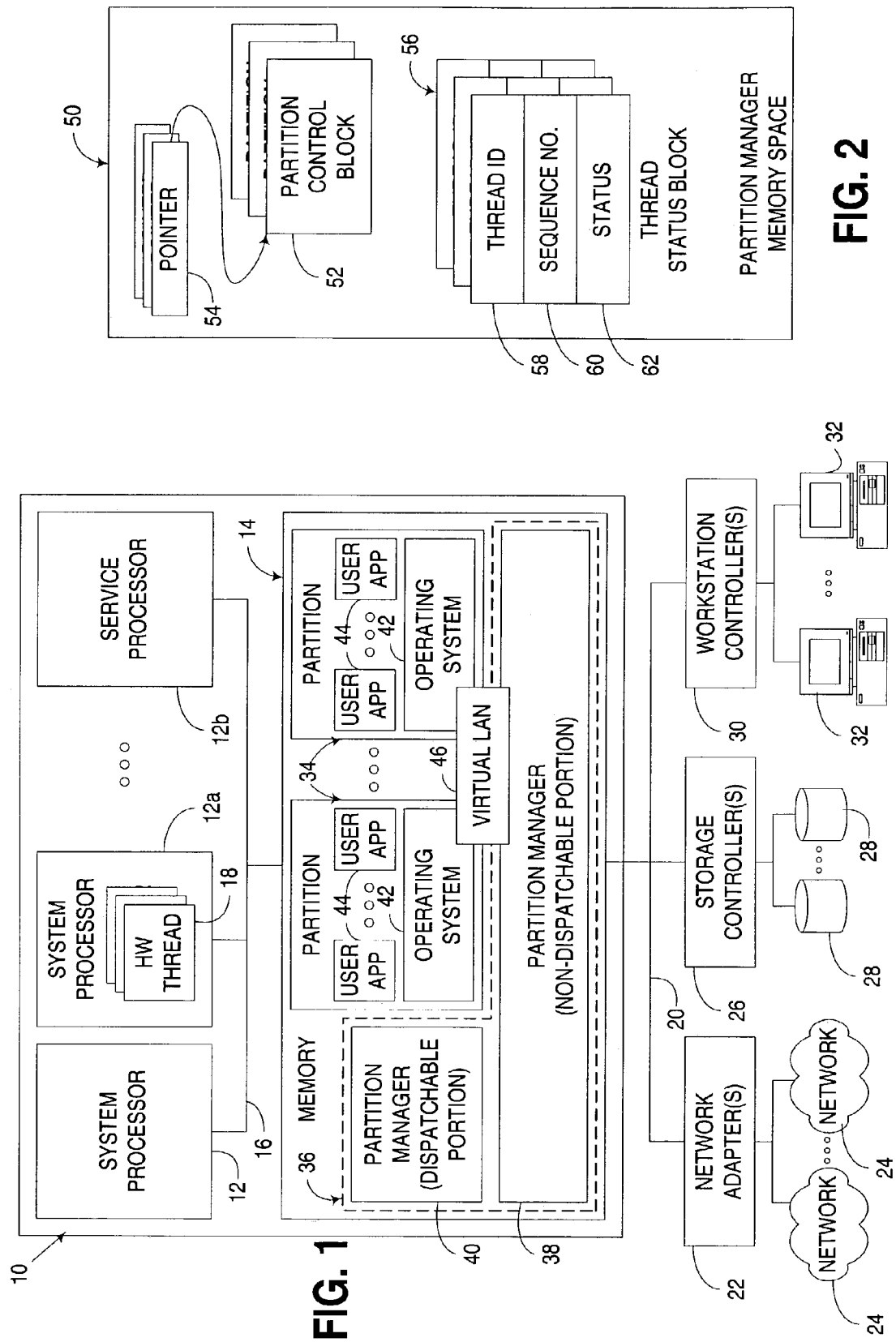

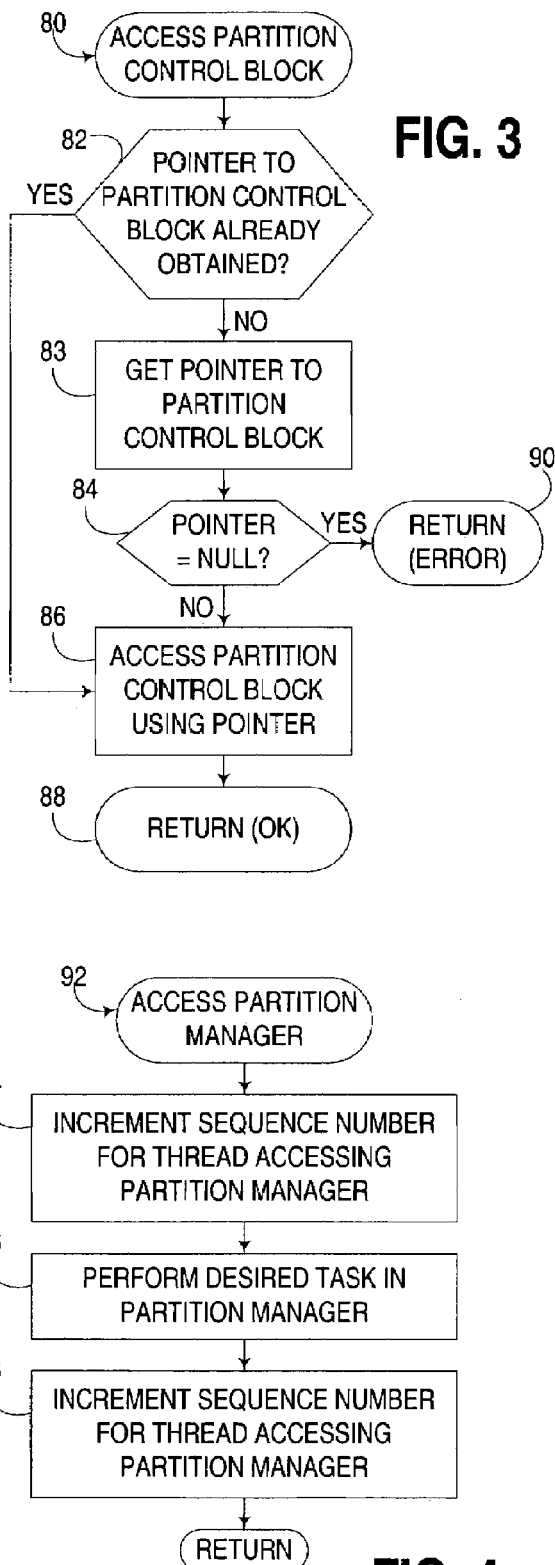
FIG. 3
FIG. 4
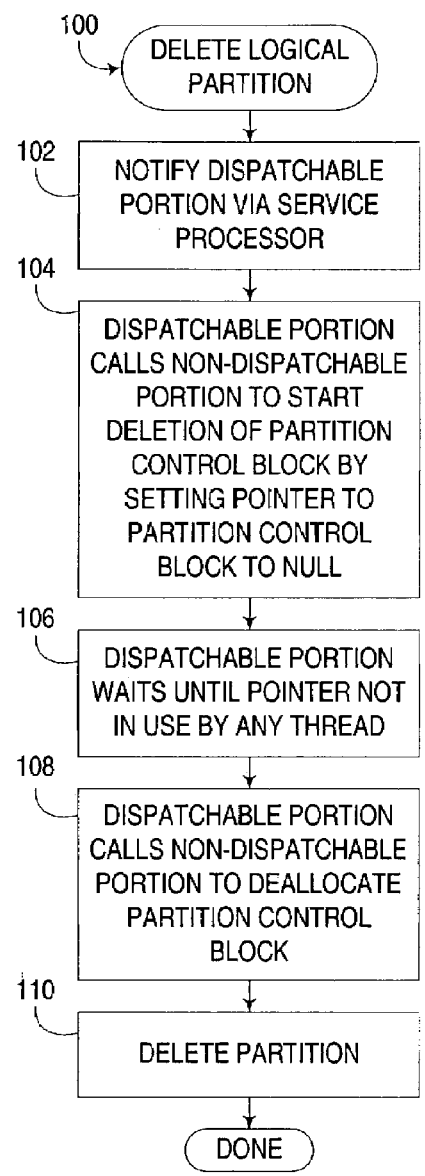
FIG. 5

DEALLOCATION OF COMPUTER DATA IN A MULTITHREADED COMPUTER

FIELD OF THE INVENTION

The invention relates to computers and computer software, and in particular, to the deallocation of shared computer data in a multithreaded computer, e.g., in connection with the deletion of a partition in a logically-partitioned computer.

BACKGROUND OF THE INVENTION

Given the continually increased reliance on computers in contemporary society, computer technology has had to advance on many fronts to keep up with increased demand. One particular subject of significant research and development efforts is parallelism, i.e., the performance of multiple tasks in parallel.

A number of computer software and hardware technologies have been developed to facilitate increased parallel processing. From a software standpoint, multithreaded operating systems and kernels have been developed, which permit computer programs to concurrently execute in multiple "threads" so that multiple tasks can essentially be performed at the same time. Threads generally represent independent paths of execution for a program. For example, for an e-commerce computer application, different threads might be assigned to different customers so that each customer's specific e-commerce transaction is handled in a separate thread.

From a hardware standpoint, computers increasingly rely on multiple microprocessors to provide increased workload capacity. Furthermore, some microprocessors have been developed that support the ability to execute multiple threads in parallel, effectively providing many of the same performance gains attainable through the use of multiple microprocessors.

From a software standpoint, some computers implement the concept of logical partitioning, where a single physical computer is permitted to operate essentially like multiple and independent "virtual" computers (referred to as logical partitions), with the various resources in the physical computer (e.g., processors, memory, input/output devices) allocated among the various logical partitions. Each logical partition executes a separate operating system, and from the perspective of users and of the software applications executing on the logical partition, operates as a fully independent computer.

With logical partitioning, a shared resource, often referred to as a "hypervisor" or partition manager, manages the logical partitions and facilitates the allocation of resources to different logical partitions. For example, a partition manager may allocate resources such as processors, workstation adapters, storage devices, memory space, network adapters, etc. to various partitions to support the relatively independent operation of each logical partition in much the same manner as a separate physical computer.

In connection with managing logical partitions, it may be desirable for individual partitions to be created and deleted without requiring the entire computer to be shut down and restarted, thus ensuring the continuing availability of other partitions in the computer. Creating new partitions is typically not particularly problematic, as new data structures may be created to support a new partition without risk of conflict. Deleting partitions, on the other hand, is often more problematic due to the need to ensure that existing data structures for a partition are no longer in use when they are deallocated, or removed, from the computer.

In particular, deleting any data structure that is capable of being accessed by multiple threads in a multithreaded computer environment requires care to be taken to ensure that no thread is still using a data structure before it is deleted. Otherwise, a thread may attempt to later access the data structure after it has been deleted, resulting in indeterminate results and potential system failure.

Conventionally, accesses to many shared data structures are managed through the use of semaphores, or spin locks. A semaphore is typically implemented as a variable or token that is associated with a shared pointer to a data structure, and that is readable by multiple threads to determine whether the pointer is currently being used by one of the threads. Whenever a thread reads a semaphore that indicates that no other thread is currently using the pointer, the thread is able to set the semaphore to a value that indicates to all other threads that the pointer is currently in use (a process referred to as "acquiring" a semaphore). Thus, when another thread wishes to access the data structure, but detects that the semaphore is held by another thread, that thread is required to wait until the other thread releases the semaphore to indicate that the pointer (and thus the data structure) is again accessible to other threads. As such, only one thread is permitted to hold a semaphore at any given time.

A significant drawback to a semaphore or spin lock is the substantial processing overhead associated with checking and acquiring a semaphore whenever an associated data structure needs to be accessed. For example, in the case of a logically-partitioned computer, a number of data structures are accessed frequently during the normal course of operation. Partition control blocks, for example, which are used to store critical partition configuration information, are typically accessed during practically every partition management operation. Requiring a thread to acquire a semaphore each time a partition control block needs to be accessed has been found to be prohibitively expensive from a performance standpoint.

Therefore, a substantial need has arisen for a manner of supporting the deallocation of data structures in a multithreaded computer with reduced processing overhead.

SUMMARY OF THE INVENTION

The invention addresses these and other problems associated with the prior art by providing an apparatus, program product and method that support the deallocation of a data structure in a multithreaded computer without requiring the use of computationally expensive semaphores or spin locks. Specifically, access to a data structure is governed by a shared pointer that, when a request is received to deallocate the data structure, is initially set to a value that indicates to any thread that later accesses the pointer that the data structure is not available. By doing so, it is assured that threads that do not have access to the data structure as of the initiation of the request to deallocate the data structure, cannot thereafter obtain access to the data structure.

In addition, to address any thread that already holds a copy of the shared pointer, and thus is capable of accessing the data structure via the shared pointer after the initiation of the request, all such threads are monitored to determine whether any thread is still using the shared pointer by determining whether any thread is executing program code that is capable of using the shared pointer to access the data structure. Otherwise, the process waits until it is determined that no thread is still using the shared pointer. Once this condition is met, it is ensured that no thread can potentially access the data structure via the shared pointer, and as such, the data structure may then be deallocated.

By signaling a pending deallocation of a data structure via setting an associated shared pointer to a unique value, the overhead associated with testing the shared pointer prior to attempting to access the data structure is significantly lower than that required to obtain a semaphore. As such, access to the data structure is substantially faster. In addition, by monitoring threads to determine whether the threads are executing program code that is capable of using the shared pointer to access the data structure, it is not necessary to determine whether a thread is actually still using the shared pointer.

One specific implementation of the aforementioned process is in connection with deleting a partition in a logically-partitioned computer, specifically to deallocate a partition control block associated with a partitioned to be deleted. To facilitate the deallocation of the partition control block, a shared pointer to the partition control block may be set to a null value to inhibit access to the partition control block, and to signify that the partition control block is no longer accessible to any thread. As such, any thread that later attempts to access the partition control block will be unable to do so.

In addition, in such an implementation, it is known that the shared pointer is accessible only via a partition manager, and not by any partition. As such, to address any threads that may still be using the shared pointer (i.e., that have obtained a copy of the shared pointer prior to its being set to a null value), the implementation waits until it can be determined that no thread is still using the shared pointer.

In this implementation, a thread may be determined to not be using the shared pointer when it is determined that the thread is inactive, the thread is in an idle loop, the thread is not executing program code for the partition manager, or the thread has exited the program code for the partition manager since the shared pointer was set to the null value. If any such condition exists, it is known that any subsequent attempts by the thread to access the data structure will result in the retrieval of a null value for the shared pointer, and thus irrespective of what program code that thread later executes that program code will not be capable of using the shared pointer to access the data structure. As such, at that point the partition control block may be deleted without adverse effects on any active thread.

It will be appreciated that the implementation of the invention in connection with a logically-partitioned computer is merely exemplary in nature, however, and as such, the invention is not limited to the particular implementation described hereinafter.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 1 is a block diagram of the principal hardware components in a logically-partitioned computer consistent with the invention.

FIG. 2 is a block diagram of a partition manager memory space illustrating a number of data structures utilized in connection with partition management in the logically-partitioned computer of FIG. 1.

FIG. 3 is a flowchart illustrating the program flow of an access partition control block routine executed by the computer of FIG. 1.

FIG. 4 is a flowchart illustrating the program flow of an access partition manager routine executed by the computer of FIG. 1.

FIG. 5 is a flowchart illustrating the program flow of a delete logical partition routine executed by the computer of FIG. 1.

DETAILED DESCRIPTION

Figure 6:
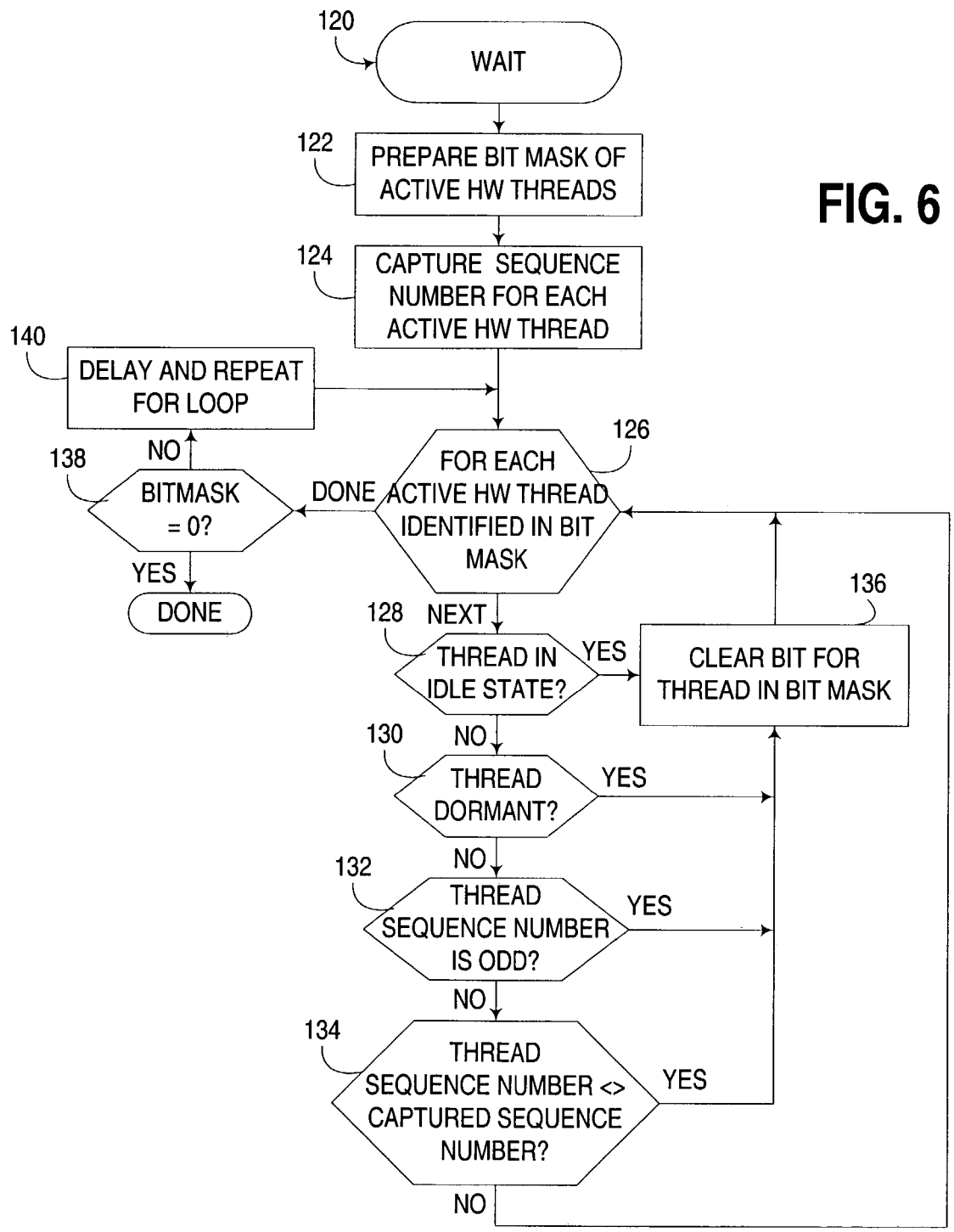
FIG. 6 is a flowchart illustrating the program flow of a wait routine executed by the dispatchable service referenced in FIG. 5.

The embodiments discussed hereinafter facilitate the orderly deallocation of a data structure in a multithreaded computer in such a manner that computationally expensive semaphores or spin locks are not required to ensure that no thread attempts to access the data structure after it has been deallocated.

Specifically, access to a data structure is governed by a shared pointer that, when a request is received to deallocate the data structure, is initially set to a value that indicates to any thread that later accesses the pointer that the data structure is not available. While other unique values may be used to signify the unavailability of the data structure, one suitable value is a null value. As such, whenever a thread attempts to obtain the pointer to access the data structure after the pointer has been set to the null value, the thread will be precluded from accessing the data structure. Moreover, it will be assured that this thread will not be able to attempt to access the data structure, even after the data structure has been deallocated from memory.

Deallocation of the data structure can only occur once it can be assured that no thread will attempt to access the data structure after the data structure has been deallocated. Consistent with the invention, such assurance is obtained by monitoring all threads in a system to determine whether any thread is still using the shared pointer by determining whether any thread is executing program code that is capable of using the shared pointer to access the data structure. Program code that is capable of using the shared pointer to access a data structure may be considered to be program code that, even after a shared pointer is has been set to a unique value such as a null value to indicate that the data structure is not available, has the potential for retaining a prior copy of the shared pointer that still references the data structure. So long as a thread is executing such program code, a risk therefore exists that an attempt may be made to access the data structure using the prior copy of the shared pointer, resulting in indeterminate results, as well as potential data corruption and/or system failure.

In the specific embodiments discussed below, for example, the data structure to be deallocated is a partition control block that is accessible only by a partition manager in a logically partitioned computer, and in particular, a non-dispatchable portion thereof. It is assumed that in these embodiments, whenever a thread enters the program code for a partition manager, the thread is required to obtain a new copy of the shared pointer for any partition control block that the thread wishes to access. As such, whenever a thread enters partition manager program code after a particular shared pointer has been set to a null value (or other appropriate unique value) in connection with an attempt to deallocate its associated data structure, it can be assumed that such a thread will not obtain a valid pointer to the data structure. Threads of concern are therefore any threads that are executing within partition manager program code at the time a shared pointer is set in connection with a request to deallocate its associated data structure, and that have not yet exited such program code, as the possibility exists that a (now-stale) copy of the shared pointer still exists.

A number of factors, which may be tested in various combinations, may be used to provide assurance that a thread is not executing program code that is capable of using a shared pointer to access a data structure. One factor, for example, is whether a thread is dormant, as a dormant thread (a thread not executing any instructions) at the time a shared pointer is set to the unique value, is incapable of retaining a stale copy of the shared pointer. Another factor is whether a thread is executing an idle loop (e.g., an idle loop in the partition manager), as such a thread likewise is incapable of retaining a stale copy of the shared pointer.

Still another factor is whether a thread is detected to be currently executing program code other than the program code that is capable of using the shared pointer when the shared pointer is set to the unique value, as it is known in such an instance that the thread will thereafter have to obtain a new copy of the shared pointer when the program code that is capable of using a shared pointer is later executed.

Yet another factor is whether a thread is detected to have exited the program code that is capable of using the shared pointer when the shared pointer is set to the unique value. In such an instance, it is known that the thread will, after having exited the program code, have to obtain a new copy of the shared pointer when the program code that is capable of using a shared pointer is later executed.

As will become more apparent below, one mechanism that may be used to test both whether a thread is currently executing program code other than that which is capable of using the shared pointer to access a data structure, as well as whether a thread has exited program code that is capable of using the shared pointer, is the use of an indicator associated with each thread that is modified whenever that thread enters and exits a particular section of program code. While a wide variety of alternate implementations may be used, one suitable indicator is a sequence number that is incremented by one whenever a thread enters program code that is capable of accessing a shared pointer, as well as whenever the thread exits that same program code. Using such a sequence number, one of an even and an odd value may be used to designate whenever a thread is executing program code other than that which is capable of using a shared pointer. Moreover, by capturing a value of the sequence number in connection with setting the shared pointer to the unique value, and then monitoring the current value of the sequence number, any difference in the value of the sequence number may be used to indicate that the thread has exited the program code at interest, and thus is incapable of using the shared pointer to access the data structure.

It will be appreciated that other factors and combinations of factors may be considered in connection with determining whether a thread is executing program code that is capable of using a shared pointer to access a data structure. Moreover, embodiments consistent with the invention may be utilized in connection with computers other than logically-partitioned computers. Therefore, the invention is not limited to the particular implementations discussed herein.

Turning now to the Drawings, wherein like numbers denote like parts throughout the several views, FIG. 1 illustrates the principal hardware components in a logically-partitioned computer 10 consistent with the invention. Computer 10 generically represents, for example, any of a number of multi-user computers such as a network server, a midrange computer, a mainframe computer, etc., e.g., an IBM eServer midrange computer. However, it should be appreciated that the invention may be implemented in other computers and data processing systems, e.g., in single-user computers such as workstations, desktop computers, portable computers, and the like, or in other programmable electronic devices (e.g., incorporating embedded controllers and the like). In addition, the invention may also be utilized in connection with non-logically partitioned multithreaded computers.

Computer 10 generally includes one or more processors 12 coupled to a memory 14 via a bus 16. Each processor 12 may be implemented as a single threaded processor, or as a multithreaded processor, such as with processor 12a, which is shown incorporating a plurality of hardware threads 18. For the most part, each hardware thread 18 in a multi-threaded processor 12a is treated like an independent processor by the software resident in the computer. In this regard, for the purposes of this disclosure, a single threaded processor will be considered to incorporate a single hardware thread, i.e., a single independent unit of execution. It will be appreciated, however, that software-based multi-threading or multitasking may be used in connection with both single threaded and multithreaded processors to further support the parallel performance of multiple tasks in the computer.

In addition, as is also illustrated in FIG. 1, one or more of processors 12 (e.g., processor 12b) may be implemented as a service processor, which is used to run specialized firmware code to manage system initial program loads (IPL's), and to monitor, diagnose and configure system hardware. Generally, computer 10 will include one service processor and multiple system processors, which are used to execute the operating systems and applications resident in the computer, although the invention is not limited to this particular implementation. In some implementations, a service processor may be coupled to the various other hardware components in the computer in manner other than through bus 16.

Memory 14 may include one or more levels of memory devices, e.g., a DRAM-based main storage, as well as one or more levels of data, instruction and/or combination caches, with certain caches either serving individual processors or multiple processors as is well known in the art. Furthermore, memory 14 is coupled to a number of types of external devices via a bus 20, e.g., one or more network adapters 22 (for interfacing the computer with network(s) 24), one or more storage controllers 26 (for interfacing the computer with one or more storage devices 28) and one or more workstation controllers 30 (for interfacing with one or more terminals or workstations 32 via a plurality of workstation adapters).

FIG. 1 also illustrates in greater detail the primary software components and resources utilized in implementing a logically partitioned computing environment on computer 10, including a plurality of logical partitions 34 managed by a partition manager or hypervisor 36. Any number of logical partitions may be supported as is well known in the art, and the number of logical partitions resident at any time in a computer may change dynamically as partitions are added or removed from the computer.

In the illustrated IBM eServer-based implementation, partition manager 36 is comprised of two layers of program code. The first, referred to herein as a non-dispatchable portion 38, is implemented within the firmware, or licensed internal code (LIC), of computer 10, which is utilized to provide a low level interface to various hardware components while isolating higher layers, e.g., the operating systems, from the details of the hardware access. The firmware may also communicate with a service processor such as service processor 12b. The non-dispatchable portion 38 provides many of the low level partition management functions for computer 10, e.g., page table management, etc. The non-dispatchable portion 38 also has no concept of tasks, and is accessible principally via function calls from higher layers of software.

The second layer of program code in partition manager 36 is referred to herein as a dispatchable portion 40. In contrast to non-dispatchable portion 38, which has no concept of tasks, is run with relocation off, and is accessible via function calls from higher layers of software, the dispatchable portion 40 has the concept of tasks (like any operating system), and is run with relocation on. The dispatchable portion typically executes in much the same manner as a partition, except that it is hidden from the user. The dispatchable portion generally manages higher level partition management operations such as creating and deleting partitions, concurrent I/O maintenance, allocating processors, memory and other hardware resources to various partitions 34, etc.

Each logical partition 34 is typically statically and/or dynamically allocated a portion of the available resources in computer 10. For example, each logical partition may be allocated one or more processors 12 and/or one or more hardware threads 18, as well as a portion of the available memory space. Logical partitions can share specific hardware resources such as processors, such that a given processor is utilized by more than one logical partition. In the alternative hardware resources can be allocated to only one logical partition at a time.

Additional resources, e.g., mass storage, backup storage, user input, network connections, and the I/O adapters therefor, are typically allocated to one or more logical partitions in a manner well known in the art. Resources may be allocated in a number of manners, e.g., on a bus-by-bus basis, or on a resource-by-resource basis, with multiple logical partitions sharing resources on the same bus. Some resources may even be allocated to multiple logical partitions at a time.

Each logical partition 34 utilizes an operating system 42 that controls the primary operations of the logical partition in the same manner as the operating system of a non-partitioned computer. For example, each operating system 42 may be implemented using the OS/400 operating system available from International Business Machines Corporation.

Each logical partition 34 executes in a separate, or independent, memory space, and thus each logical partition acts much the same as an independent, non-partitioned computer from the perspective of each user application (user app) 44 that executes in each such logical partition. As such, user applications typically do not require any special configuration for use in a partitioned environment.

Given the nature of logical partitions 34 as separate virtual computers, it may be desirable to support inter-partition communication to permit the logical partitions to communicate with one another as if the logical partitions were on separate physical machines. As such, in some implementations it may be desirable to support a virtual local area network (LAN) 46 in non-dispatchable portion 38 to permit logical partitions 34 to communicate with one another via a networking protocol such as the Ethernet protocol. Other manners of supporting communication between partitions may also be supported consistent with the invention.

It will be appreciated that other logically-partitioned environments may be utilized consistent with the invention. For example, rather than utilizing a dispatchable portion 40 that is separate from any partition 34, the functionality of the dispatchable portion may be incorporated into one or more logical partitions in the alternative.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In addition, various program code described hereinafter may be identified based upon the application or software component within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

As noted above, in the herein-described embodiment, the deallocation of a data structure is performed in connection with the deletion of a partition in a logically-partitioned computer. It is desirable to support the ability to dynamically create and delete partitions in a logically-partitioned computer without requiring Initial Program Loading (IPL'ing) or rebooting the computer. In connection with such operations, data structures known as partition control blocks are maintained for active partitions to store necessary configuration for an associated partition. Creation of a logical partition in part entails the creation of an associated partition control block. Likewise, deletion of a logical partition in part entails the deallocation of the associated partition control block.

Practically every operation performed in a partition manager, and in particular, in the non-dispatchable portion thereof that typically resides in system firmware, requires an access to a partition control block. Such access is typically performed via the use of a shared pointer to the partition control block, wherein the pointer is shared from the perspective that a copy of the pointer may be obtained by multiple threads in the system. Typically, a thread desiring to access a partition control block must first obtain a copy of the pointer thereto; once the copy is obtained, further accesses are possible via the same copy of the pointer.

For example, as shown in FIG. 2, a memory space 50 for partition manager 36 (FIG. 1) may include a set of partition control blocks 52, each respectively pointed to by one of a set of shared pointers 54.

Since a partition control block is accessed in connection with practically every operation performed in a partition manager, any time a thread executes program code in the partition manager, a high likelihood exists that the associated partition control block will be accessed by the thread, and that the thread will have obtained a copy of the shared pointer to such block. Given the frequency of such operations, conventional mechanisms for synchronizing accesses to shared resources, such as semaphores or spin locks, are excessively expensive from a computational standpoint, which can excessively degrade system performance.

To address this concern, the hereinafter-described embodiment takes advantage of the fact that partition deletion operations are asynchronous in nature, and as such, are suitable for higher level synchronization protocols. Moreover, typically a thread executing in partition manager program code is not preemptable, so the hereinafter-described embodiments can also take advantage of this fact as well.

In particular, the hereinafter-described embodiment handles a request to deallocate a partition control block by initially setting the shared pointer to that block to a unique value that indicates that the block is no longer available, e.g., a null value. In addition, the hereinafter-described embodiment maintains, for each hardware thread or processor, an indicator, referred to herein as a sequence number, that is incremented whenever the associated thread or processor enters partition manager program code (e.g., as a result of a function call, interrupt, machine check or system reset). The sequence number is also incremented when the thread or processor leaves the partition manager program code. The sequence number is incremented in this embodiment between odd and even values (e.g., by adding one to the sequence number for each increment), such that the presence of a thread in partition manager program code is indicated by either an odd or even value, as appropriate. For example, if the sequence number is odd prior to entering partition manager program code, and is then incremented upon entrance, an even value will indicate that the partition manager program code is being executed by the thread. Conversely, an odd value will indicate that the thread is not executing partition manager program code, and as such, the thread will not have a previous copy of the shared pointer that still points to the partition control block to be deallocated.

In addition, the sequence number serves to detect when a thread or processor has left and reentered partition manager program code. In particular, as will become more apparent below, the value of the sequence number may be captured at two points in time, such that even when the thread is initially found to be executing the partition manager program code when the request to deallocate a partition control block is received, any change in the value of the sequence number thereafter will indicate that the thread has at some point left the partition manager program code, and thus no longer has a previous copy of the shared pointer that still points to the partition control block to be deallocated.

In addition, the hereinafter-described embodiment also maintains, for each hardware thread or processor, a status field that indicates whether the thread or processor is either (1) dormant (i.e., not executing instructions), or (2) waiting for work in an idle thread (e.g., executing instructions in a partition manager idle thread), as it can be determined that in either case, the thread or processor will not have a previous copy of the shared pointer that still points to the partition control block to be deallocated.

As shown in FIG. 2, for example, one manner of storing the appropriate per-thread or per-processor indicators used to determine whether a thread or processor is executing program code capable of using a shared pointer is via a plurality of thread status blocks 56. In each block is stored a thread identifier field 58 that ties the block 56 to a particular hardware thread or processor (in the case of single-threaded processors). In addition, each block 56 also includes a sequence number field 60 and a status field 62 that serve the purposes described above.

It will be appreciated that a wide variety of alternate indicators, and data structures therefor, may be used in connection with determining whether threads or processors are executing program code capable of using a shared pointer. The invention is therefore not limited to the particular implementations discussed herein. For example, a sequence number may be implemented using practically any formula that results in two sets of values being defined that respectively indicate whether a thread is or is not executing partition manager program code. In the illustrated embodiment, for example, the two sets of values are odd and even numbers. In addition, different indicators may be used to detect (1) whether a thread is currently executing partition manager program code, and (2) whether a thread has crossed a boundary between partition manger and other program code. Furthermore, other thread status information may also be used in the alternative.

FIGS. 3-6 next illustrate various exemplary routines that may be utilized in computer 10 to implement deletion of a logical partition, and an associated deallocation of a partition control block, in a manner consistent with the invention. FIG. 3, in particular, illustrates an access partition control block routine 80 that may be executed by a thread executing partition manager program code whenever the thread needs to access a partition control block. As noted above, a partition control block in the illustrated embodiment is accessible via a shared pointer. It is assumed, therefore, that any time a hardware thread enters partition manager program code (e.g., as a result of a function call or interrupt), the thread will need to obtain a new copy of the shared pointer to any partition control block that the thread needs to access. It is also assumed, however, that whenever the hardware thread leaves the partition manager program code, any existing copies of shared pointers will be discarded.

Routine 80 therefore begins in block 82 by determining first whether the current thread that is executing routine 80 already has a copy of the pointer to the partition control block. Assuming, for example, that the thread does not yet have a copy of the pointer, block 82 passes control to block 83 to obtain a copy of the pointer to the partition control block. Next, block 84 determines whether the pointer is set to null, i.e., a value that indicates that the partition control block is not available. If not, block 84 passes control to block 86 to access the partition control block using the pointer, in a manner well known in the art. Control then passes to block 88 to terminate routine 80 and return an "ok" status to signify that the access was successful.

Returning to block 84, if the pointer is set to a null value, control instead passes to block 90 to terminate routine 80 with an "error" status to signify that the access was unsuccessful. The caller of routine 80 will then handle the unsuccessful access in an appropriate manner. In addition, returning to block 82, if a pointer to the partition control block has already been obtained when routine 80 is called, control passes directly to block 86 to access the partition control block with the pointer, and terminate the routine in a normal fashion.

It may therefore be seen that, in contrast with semaphore or lock implementations where significant processing overhead is require to obtain a semaphore or lock each time a pointer is accessed, routine 80 requires that a thread test the pointer for a null value only the first time that the pointer is retrieved while a thread is executing partition manager program code. The path length and subsequent processing overhead are therefore significantly reduced.

Now turning to FIG. 4, an access partition manger routine 92 is generically illustrated. Routine 92 is called whenever a thread transitions from executing partition or other non-partition manager program code to executing partition manager program code, and illustrates the concept of incrementing a sequence number associated with the thread both before (block 94) and after (block 98) actually performing the desired task in the partition manager (block 96). It is assumed that in this embodiment, the sequence number is initially set to an even value when the thread is created in the partition manager program code, such that an odd value indicates that the thread is executing program code other than partition manager program code.

It will be appreciated that blocks 94, 96 and 98 are typically performed by partition manager program code, although in some implementations, other program code, such as program code resident in a partition, may perform one or more of these operations. Moreover, it will be appreciated that, in some instances, the partition manager program code that initiates the increment of a sequence number as the program code is entered and exited may include only a non-dispatchable portion of the partition manager program code, or alternatively, both non-dispatchable and dispatchable portions thereof.

Setting of a status field for each thread or processor is not separately illustrated herein, as the setting of the status field, e.g., to indicate when a thread is dormant (not executing instructions) or waiting for work in a partition manager idle loop, typically incorporates only an appropriate write to the dedicated status field for a thread whenever the state of the thread changes.

FIG. 5 next illustrates a delete logical partition routine 100 that is performed in computer 10 in connection with deleting a partition. In the illustrated embodiment, routine 100 is initiated via a request from a user interface in the computer to delete a particular partition. In response to such a request, and as is shown in block 102, the service processor may notify the dispatchable portion of the partition manager of the request, resulting in a thread in the computer gaining control in the dispatchable portion of the partition manager. Next, as shown in block 104, the dispatchable portion may call a service in the non-dispatchable portion of the partition manager to initiate the deletion of the partition control block for the partition to be deleted, specifically by setting the pointer to the partition control block to a null value. A copy of the previous value for the pointer, however, may be stored in the non-dispatchable portion to facilitate later deallocation of the partition control block.

Next, as shown in block 106, once the pointer has been set to a null value, the call returns control to the dispatchable portion of the partition manager, which waits until it can be determined that the pointer is no longer in use by any thread in the computer. Thereafter, as shown in block 108, the dispatchable portion issues a call to the non-dispatchable portion to deallocate the memory for the partition control block. Control then returns to the dispatchable portion, and any other operations required to fully delete the partition are then completed, as illustrated in block 110. Routine 100 is then complete.

FIG. 6 illustrates an exemplary wait routine 120 that may be executed by the dispatchable portion of the partition manager when waiting in block 106 of routine 100. Specifically, routine 120 may begin in block 122 by preparing a bit mask of the active threads (or processors) in the computer. Next, in block 124, the sequence number for each active thread (or processor) is captured, and a loop is initiated in block 126 to wait until it can be determined that no active thread is capable of accessing the partition control block via an earlier copy of the shared pointer that has-been set to null in connection with deallocation of the partition control block.

In particular block 126 initiates a for loop to process each active thread identified in the bit mask prepared in block 122. For each such thread, control passes to blocks 128, 130, 132 and 134 to test four factors that are indicative of whether a thread is capable of using an earlier or stale copy of the shared pointer for the partition control block.

Blocks 128 and 130, for example, determine whether the status field for the thread indicates that the thread is in an idle state or loop, or is otherwise dormant. Block 132 determines whether the current sequence number for the thread is an odd value, which indicates that the thread is executing program code other than partition manager program code. Block 134 determines whether the current sequence number for the thread is different than that captured above in block 124, which indicates that the thread has left the partition manager program code (and potentially reentered such program code) at some point subsequent to when the process of deallocating the partition control block was initiated, and the pointer was set to the null value.

Any time any of the conditions tested in blocks 128-134 is true, control passes to block 136 to clear the bit associated with the thread in the bit mask. Control then returns to block 126 to process the remaining active threads. In contrast, if none of the conditions tested in blocks 128-134 is true, block 136 is bypassed, and control passes directly to block 126, with the bit associated with the thread still set in the bit mask to indicate that the thread is still executing program code that is capable of using the shared pointer.

Once all active threads have been processed, block 126 passes control to block 138 to determine whether the bit mask is equal to zero, indicating that no active thread is capable of using the shared pointer to access the partition control block. If so, block 138 terminates routine 120, and the process of deallocating the partition control block may then commence. Otherwise, as long as any active thread is still executing partition manager program code that is capable of using the shared pointer to access the partition control block, block 138 passes control to block 140 to delay for some period of time, and then restart the for loop of block 126 to again poll all active threads. Unless and until no active thread is detected that could potentially retain a copy of the shared pointer and access the data structure, routine 120 will thus repeat the for loop of block 126.

Various modifications to the herein-described embodiments will be apparent to one of ordinary skill in the art having the benefit of the instant disclosure. Therefore, the invention lies in the claims hereinafter appended.

What is claimed is:

1. A method of deleting a partition from a logically-partitioned computer of the type including a plurality of logical partitions managed by a partition manager, the logically-partitioned computer further including a plurality of threads executing thereon, and the partition manager having access to a partition control block associated with the partition being deleted, the method comprising:

incrementing a sequence number associated with a first thread among the plurality of threads to one of an odd and an even value whenever the first thread enters program code for the partition manager;

incrementing the sequence number from the other of an odd and an even value whenever the first thread exits the program code; and deallocating the partition control block by:
setting a shared pointer to the partition control block to a null value to indicate that the partition control block is not available; capturing a value of the sequence number; waiting until each of the plurality of threads is no longer using the shared pointer by monitoring each thread to determine whether said each thread is executing program code that uses the shared pointer, including determining that said each thread is no longer using the shared pointer in response to meeting at least one of a plurality of conditions that includes a first condition where said each thread is inactive, a second condition where said thread is executing in an idle loop in the partition manager, a third condition where said each thread is currently executing program code other than program code for the partition manager, and a fourth condition where the sequence number has changed from the captured value; and deallocating the partition control block after setting the shared pointer to the null value and waiting until each of the plurality of threads is no longer using the shared pointer.

2. A method of deallocating a data structure accessible by a plurality of threads executing in a computer, the method comprising, in response to a request to deallocate the data structure:

setting a shared pointer to the data structure to a predetermined value that indicates to a thread thereafter attempting to use the pointer that the data structure is not available;

waiting until each of the plurality of threads is no longer using the shared pointer by monitoring said each thread to determine whether said each thread is executing program code that is capable of using the shared pointer to access the data structure; and deallocating the data structure after setting the shared pointer to the predetermined value and waiting until said each of the plurality of threads is no longer using the shared pointer;

wherein determining whether said each thread is executing program code that is capable of using the shared pointer to access the data structure includes determining that said each thread among the plurality of threads is no longer using the shared pointer in response to meeting at least one of a plurality of conditions that includes a first condition where said each thread is inactive, a second condition where said each thread is executing in an idle loop, a third condition where said each thread is currently executing program code other than that which is capable of using the shared pointer, and a fourth condition where the first thread has exited the program code that is capable of using the shared pointer.

3. The method of claim 2, wherein the idle loop is a partition manager idle loop.

4. The method of claim 2, wherein determining whether said each thread is executing program code that is capable of using the shared pointer to access the data structure includes determining whether an indicator associated with said each thread indicates that said each thread is currently executing other program code.

5. The method of claim 2, wherein determining whether said each thread is executing program code that is capable of using the shared pointer to access the data structure further includes determining whether an indicator associated with said each thread indicates that said each thread has exited the program code.

6. The method of claim 2, wherein determining whether said each thread is executing program code that is capable of using the shared pointer to access the data structure includes determining whether an indicator associated with said each thread indicates that said each thread is currently executing the program code or that said each thread has exited the program code, wherein the indicator comprises a sequence number that is updated from a first value to a second value whenever said each thread enters the program code, and that is updated from the second value to a third value whenever said each thread exits the program code, and wherein determining whether the indicator associated with said each thread indicates that the first thread has exited the program code includes comparing the indicator with an earlier value thereof.

7. The method of claim 2, further comprising:

incrementing a sequence number associated with said each thread from a first value selected from a first set of values to a second value selected from a second set of values whenever said each thread enters the program code; and incrementing the sequence number from the second value to a third value selected from the first set of values whenever said each thread exits the program code;

wherein waiting until said each of the plurality of threads is no longer using the shared pointer includes capturing a value of the sequence number prior to monitoring said each thread, and wherein determining whether said each thread is executing program code that is capable of using the shared pointer to access the data structure includes determining whether the sequence number associated with said each first thread has a value selected from the second set of values, and determining whether the sequence number has a value that differs from the captured value.

8. The method of claim 7, wherein the first set of values consists of odd numbers, and the second set of values consists of even numbers.

9. The method of claim 2, wherein the computer is a logically-partitioned computer, and wherein the program code comprises a partition manager accessible to a plurality of logical partitions in the computer.

10. The method of claim 9, wherein the program code comprises a non-dispatchable portion of the partition manager.

11. The method of claim 9, wherein the data structure comprises a partition control block used by the partition manager.

12. The method of claim 2, wherein setting the shared pointer to the predetermined value comprises setting the shared pointer to a null value.

13. The method of claim 2, wherein at least one of the plurality of threads executes on a single-threaded processor.

14. The method of claim 2, wherein at least one of the plurality of threads execute on a multithreaded processor.

* * * * *